(12) United States Patent
Rider et al.

(10) Patent No.: US 11,292,709 B2
(45) Date of Patent: Apr. 5, 2022

(54) BEVERAGE DISPENSER WITH CONTAINER ENGAGEMENT FEATURES

(71) Applicant: Coravin, Inc., Burlington, MA (US)

(72) Inventors: Michael Rider, Lowell, MA (US); Otto DeRuntz, Dunstable, MA (US); Gregory Lambrecht, Natick, MA (US)

(73) Assignee: Coravin, Inc., Bedford, MA (US)

( * ) Notice: Subject to any disclaimer, the term of this patent is extended or adjusted under 35 U.S.C. 154(b) by 420 days.

(21) Appl. No.: 16/218,912

(22) Filed: Dec. 13, 2018

(65) Prior Publication Data

US 2019/0202680 A1 Jul. 4, 2019

Related U.S. Application Data

(60) Provisional application No. 62/611,952, filed on Dec. 29, 2017.

(51) Int. Cl.
*B67D 1/04* (2006.01)
*B67D 1/08* (2006.01)
(Continued)

(52) U.S. Cl.
CPC .............. *B67D 1/0412* (2013.01); *B67B 7/26* (2013.01); *B67D 1/0802* (2013.01);
(Continued)

(58) Field of Classification Search
CPC .. B67D 1/0412; B67D 1/0802; B67D 1/0885; B67D 1/0889; B67B 7/26; F16B 2/10; B67C 3/242
(Continued)

(56) References Cited

U.S. PATENT DOCUMENTS 2,492,309 A 12/1949 Miller
3,372,838 A 3/1968 Smith et al.
(Continued)

FOREIGN PATENT DOCUMENTS

WO WO 2017/091549 A1 6/2017

OTHER PUBLICATIONS

Invitation to Pay Additional Fees for International Application No. PCT/US2018/066478, dated Mar. 22, 2019.
(Continued)

*Primary Examiner* — Eret C McNichols
*Assistant Examiner* — Michael McDuffie
(74) *Attorney, Agent, or Firm* — Wolf, Greenfield & Sacks, P.C.

(57) ABSTRACT

A clamp of the dispensing device may include a container engagement surface arranged to engage and/or disengage the clamp from the container neck when the clamp is pushed downwardly or pulled upwardly relative to the container neck. The container engagement surface may include a surface with a lower portion that slopes upwardly and inwardly, and an upper portion that slopes upwardly and outwardly relative to the container neck and that moves the clamp radially outwardly and away from the container neck as the clamp is moved vertically relative to the container neck. A latch may maintain a body portion of the dispensing device in an upper position, preventing needle insertion, until a container is suitably engaged with the base portion of the device, e.g., by a clamp. Sensors may detect engagement of a container with the device and/or insertion of a needle into the container.

15 Claims, 7 Drawing Sheets

(51) Int. Cl.
*B67B 7/00* (2006.01)
*F16B 2/10* (2006.01)
*B67D 1/00* (2006.01)

(52) U.S. Cl.
CPC ......... *B67D 1/0885* (2013.01); *B67D 1/0888* (2013.01); *B67D 1/0889* (2013.01); *F16B 2/10* (2013.01); *B67D 1/0418* (2013.01); *B67D 2001/0098* (2013.01); *B67D 2001/0481* (2013.01); *B67D 2001/0487* (2013.01); *B67D 2001/0812* (2013.01); *B67D 2001/0825* (2013.01)

(58) Field of Classification Search
USPC ......... 222/400.7, 81, 399, 82; 248/689, 312, 248/316.1, 316; 141/4, 11, 67, 70, 329, 141/330, 319, 320, 14, 17
See application file for complete search history.

(56) References Cited

U.S. PATENT DOCUMENTS

| | | | | |
|---|---|---|---|---|
| 3,976,221 A * | 8/1976 | Martin | ................ | B67D 1/0418 222/61 |
| 4,828,147 A * | 5/1989 | Wiedmann | ........... | B67D 1/0425 222/82 |
| 4,982,879 A * | 1/1991 | Corrado | ............... | B67D 1/0412 222/399 |
| 4,984,711 A * | 1/1991 | Ellis | .......................... | B67B 7/26 222/152 |
| 5,947,172 A * | 9/1999 | Glotin | ...................... | B60S 5/04 141/383 |
| 6,477,920 B1 * | 11/2002 | Yang | ........................ | B67B 7/08 81/3.2 |
| 6,508,163 B1 * | 1/2003 | Weatherill | ............. | A47G 23/00 261/112.1 |
| 6,796,342 B2 * | 9/2004 | De Antoni Migliorati | ................. | B67C 3/242 141/165 |
| 7,712,637 B2 * | 5/2010 | Lambrecht | ........... | B67D 1/0418 222/400.7 |
| 8,141,746 B2 * | 3/2012 | Lambrecht | ........... | B67D 1/0885 222/152 |
| 8,205,541 B2 * | 6/2012 | Barberio | ............... | B01F 5/0682 99/277.1 |
| 8,720,841 B2 * | 5/2014 | Morren | ...................... | F16B 2/10 248/316.5 |
| 9,010,588 B2 * | 4/2015 | Lambrecht | ........... | B67D 1/0412 222/399 |
| 10,258,937 B2 * | 4/2019 | Hubbard, Jr | ............. | B67D 1/10 |
| 2009/0101680 A1 * | 4/2009 | Laws | .................. | B01F 15/0206 222/399 |
| 2009/0183798 A1 * | 7/2009 | Till | ........................ | B67C 3/242 141/148 |
| 2014/0263470 A1 * | 9/2014 | Wanless | ............... | B67D 7/0294 222/400.7 |
| 2015/0297461 A1 * | 10/2015 | Fangrow | ............... | A61J 1/2048 141/1 |
| 2017/0144877 A1 * | 5/2017 | Rider | ................... | B67D 1/0801 |
| 2019/0210859 A1 * | 7/2019 | Lambrecht | ........... | B67D 1/0004 |
| 2019/0322466 A1 * | 10/2019 | Schulnig | .............. | B65G 47/847 |

OTHER PUBLICATIONS

International Search Report and Written Opinion for International Application No. PCT/US2018/066478, dated May 14, 2019.

* cited by examiner

BEVERAGE DISPENSER WITH CONTAINER ENGAGEMENT FEATURES

RELATED APPLICATION

This Application claims priority under 35 U.S.C. § 119(e) to U.S. Provisional Application Ser. No. 62/611,952, filed Dec. 29, 2017, which is herein incorporated by reference in its entirety.

BACKGROUND OF INVENTION

This invention relates generally to the dispensing or other extraction of fluids from within a container, e.g., in the dispensing of wine from a wine bottle. Beverage dispensers, including devices arranged to clamp to a container, are described in U.S. Pat. Nos. 9,010,588 and 7,712,637.

SUMMARY OF INVENTION

One or more embodiments in accordance with aspects of the invention allow a user to withdraw or otherwise extract a beverage, such as wine, from within a bottle that is sealed by a cork, plug, elastomeric septum or other closure without removing the closure. In some cases, removal of liquid from such a bottle may be performed one or more times, yet the closure may remain in place during and after each beverage extraction to maintain a seal for the bottle. Thus, the beverage may be dispensed from the bottle multiple times and stored for extended periods between each extraction with little or no effect on beverage quality. In some embodiments, little or no gas, such as air, which is reactive with the beverage may be introduced into the bottle either during or after extraction of beverage from within the bottle. Thus, in some embodiments, a user may withdraw wine from a wine bottle without removal of, or damage to, the cork, and without allowing air or other potentially damaging gasses or liquids entry into the bottle.

In one aspect of the invention, a beverage dispensing device includes a body with a needle arranged to receive a flow of beverage under pressure from a beverage container and to dispense the beverage at a dispensing outlet of device. For example, the needle may include one or more lumens or passageways that receive beverage under pressure from a container, such as a wine bottle. In some embodiments, the needle may be passed through a cork or other closure of the container to both introduce pressurized gas into the container and receive beverage from the container. Beverage delivered by the needle to the dispensing outlet may be dispensed into a user's cup or glass.

In some embodiments, a base of the device may include a clamp that is attached to the body and arranged to engage a container neck to secure the body relative to the container neck. For example, the clamp may include one or more clamp arms arranged to engage the container neck and secure the body so that lifting the body can lift both the body and the engaged container. This may allow a user to pour beverage from the container by manipulating the body alone. In other arrangements, the clamp may secure the body to the container so that the device is suspended from or otherwise secured to the container without other support. In some embodiments, the at least one clamp arm may define a receiving space with an entry opening at a bottom of the clamp to receive the container neck into the receiving space. That is, the container neck may be inserted into the receiving space by positioning the container neck into the entry opening at the bottom of the clamp and moving the container neck upwardly into the receiving space (or said another way, by positioning the entry opening over the container neck and moving the clamp downwardly onto the container neck). As an example, the container may be placed on a table top or other surface, and the container neck may be fully received into the receiving space of the clamp by inserting the container neck into the entry opening and moving the clamp downwardly relative to the container neck. In some embodiments, the at least one clamp arm may be spring biased to move relative to the base to exert an engagement force on the container neck when the neck is fully received in the receiving space. When receiving the container neck into the receiving space by moving the clamp downwardly onto the container, the at least one clamp arm may be moved against the spring bias so as to enlarge the receiving space and allow the container neck to be fully received.

In some embodiments, the at least one clamp arm includes a container engagement surface to aid in receiving and engaging with a container neck. For example, an engagement surface may extend vertically on an interior surface of a clamp arm and help guide movement of the container neck, as well as move the clamp arm relative to the base to allow for proper engagement of the container neck. In some embodiments, the engagement surface may have a lower portion that slopes inwardly and upwardly relative to the receiving space. The lower portion may be arranged to allow the clamp to be pushed downwardly on the container neck to receive the container neck in the receiving space and move the at least one clamp arm away from the container neck, e.g., against a spring bias on the clamp arm, while the at least one clamp arm exerts an engagement force on the container neck. In some cases, the lower portion of the container engagement surface may be arranged to contact a lip of the container neck such that the lower portion exerts a radially outward force on the at least one clamp arm to move the at least one clamp arm away from the lip of the container neck as the clamp is moved downwardly relative to the container neck to receive the container neck in the receiving space. In some cases, the container engagement surface includes an upper portion positioned above the lower portion that slopes outwardly and upwardly relative to the receiving space, e.g., such that the upper portion is arranged to disengage the clamp from a fully received container neck as the clamp is pulled upwardly relative to the container neck. The upper portion may exert a radially outward force on the at least one clamp arm to move the at least one clamp arm against the spring bias and away from the container neck as the clamp is moved upwardly relative to the container neck. Thus, the engagement surface may not only contact the container neck and exert a radially inward force on the container neck when in the receiving space to secure the container neck in place, but may allow the clamp to be engaged or disengaged from the container neck by moving the clamp and container relative to each other in a vertical direction.

In some embodiments, the at least one clamp arm includes two clamp arms that are spring biased to move toward each other and arranged to engage the container neck with the container neck positioned in the receiving space between the clamp arms. The two clamp arms may be both movably mounted to the base such that the arms can be moved towards and away from each other, and each may include an engagement surface as discussed above. For example, the clamp arms may be pivotally mounted to the base on a proximal side of the clamp arms and the container engagement surfaces may be located on a distal side of the arms. As the clamp is pushed downwardly onto a container neck, the engagement surfaces may move the clamp arms away from each other against the spring bias to receive the container neck. The base may include a stop, such as a needle guide, arranged at an upper end of the receiving space to contact a top of the container neck positioned between the clamp arms such that the container neck is fully received in the receiving space when the top of the container neck contacts the stop.

In another aspect of the invention, a beverage dispensing device may include a base to engage with a neck of a beverage container, and a body movably mounted to the base between upper and lower positions and having a needle attached to and extending from the body. The needle may be arranged to be inserted through a closure of a beverage container to introduce pressurized gas into the beverage container and extract beverage from the container. A latch may releasably lock the body in the upper position until the container neck is engaged by the base, and the latch may be arranged to release the body for movement from the upper position to the lower position to insert the needle through the closure upon engagement of the base with the container neck. As an example, this latch feature may be combined with a device having a clamp, e.g., arranged as discussed above, and the latch may lock the body relative to the base until the clamp is suitably engaged with the container and the device is ready to insert the needle through the closure. In some embodiments, a user may be able to engage a container neck with the clamp and then immediately insert the needle through the container closure in a single downward movement. Any and all of the features discussed above regarding a clamp may be combined with the latch feature, whether alone or in various combinations.

In some embodiments, the base includes a stop arranged to contact a top of the container neck when engaged by the base, and the latch may be configured to release the body for movement when the top of the container neck contacts the stop. The stop may include a needle guide arranged to contact a top of a container neck engaged by the base and to guide movement of the needle through the closure with downward movement of the body relative to the base.

In another aspect of the invention, a beverage dispensing device may include a base to engage with a neck of a beverage container, and a body movably mounted to the base between upper and lower positions and having a needle attached to and extending from the body. The needle may be arranged to be inserted through a closure of a beverage container to introduce pressurized gas into the beverage container and extract beverage from the container. A container sensor may be arranged to detect that the container neck is engaged by the base, and a needle sensor may be arranged to detect that the needle is inserted through the closure of the beverage container. Thus, in some cases, the dispensing device may be controlled based on information from the container and/or needle sensor so that gas delivery or beverage dispensing is enabled only once the device is suitably engaged with a beverage container and/or a needle is inserted through a closure.

In some embodiments, a controller may be arranged to enable gas flow if the container sensor detects engagement of the container with the base and the needle sensor detects the needle inserted through the closure. As an example, the base may include a clamp to engage with a neck of the container, and the container sensor may detect that the clamp has engaged with the container neck. In some cases, the container sensor includes a switch that is actuated by contact of a container neck engaged by the clamp. The base may include a stop arranged to contact a top of a neck of the container when the container neck is engaged by the base, and the container sensor may include a switch that is actuated by contact of the top of the container neck with the switch. The stop may include a needle guide arranged to guide movement of the needle through the closure of the container.

In some embodiments, the body is movable relative to the base between an upper position and a lower position, and the needle sensor includes a switch that is actuated when the body is in the lower position relative to the base. Thus, the needle sensor may be arranged to detect that the needle is inserted through the closure of the beverage container when the container sensor detects that the base is engaged with a container neck and the needle sensor switch is actuated to indicate the body is in the lower position. As in embodiments above, the body may include a clamp to engage with the container neck, the container sensor may be actuated by a container neck engaged by the clamp, and the needle sensor may detect that the body is in a lower position relative to the clamp to indicate that the needle is inserted through the closure. In some cases, a controller may be arranged to enable gas flow only if the container sensor switch is actuated by the container neck and the needle sensor switch is actuated by the body at the lower position.

In one embodiment, the body may be movable between an upper position and the lower position relative to the base, and the device may include a latch that releasably locks the body in the upper position until the container sensor is actuated by the container neck. The latch may be arranged to release the body for movement from the upper position to the lower position to insert the needle through the closure upon actuation of the container sensor. For example, the latch may be electrically actuated by a controller to release the body for movement when the container sensor detects engagement with a container.

In some embodiments, the device may include a source of pressurized gas arranged to deliver pressurized gas into a beverage container. The device may be fluidly coupled to the beverage container, e.g., by a needle, to receive the flow of beverage under pressure caused by the pressurized gas in the beverage container. A valve may be arranged to control a flow of pressurized gas into the beverage container or to control the flow of beverage under pressure from the beverage container. For example, if the device includes a needle arranged to be inserted through a closure of a beverage container to deliver the pressurized gas into the beverage container, a valve may be used to control flow of pressurized gas into the needle, and/or to control flow of beverage under pressure from the beverage container through the conduit.

In one embodiment, a dispensing system may include a container orientation sensor to detect whether the container is in a pour orientation or a no-pour orientation, and a controller may be arranged to control at least one valve to allow gas or beverage flow when the container is in a pour orientation and to control the at least one valve to prohibit gas or beverage flow when the container is in a no-pour orientation. For example, the container orientation sensor may detect a pour condition when a bottom of the container is above an opening of the container, and/or when a longitudinal axis of the container is rotated about a horizontal axis by at least 90 degrees. Thus, for example, a user may tilt or otherwise manipulate a wine bottle or other container in a way similar to that used to conventionally pour beverage from the bottle, and the system may automatically begin or otherwise control dispensing based on container position, as well as stop dispensing when the bottle is tilted back to an upright or nearly upright position.

In some cases, the controller may be arranged to open the at least one valve to allow pressurized gas to flow into the container when the container is in a pour orientation and to close the at least one valve to prohibit pressurized gas to flow into the container when the container is in a no-pour orientation. Such an arrangement may be useful when two conduits are used to access the container where one conduit delivers gas into the container and the other conduit delivers beverage from the container. In another embodiment, the at least one conduit, such as a needle, includes a single conduit, and the controller is arranged to alternate between opening the at least one valve to allow pressurized gas to flow into the container via the single conduit and closing the at least one valve to prohibit pressurized gas to flow into the container and allow beverage to flow from the container via the single conduit when the container is in a pour orientation. In another arrangement, the controller may be arranged to open the at least one valve to allow beverage to flow from the at least one conduit to a beverage outlet when the container is in a pour orientation and to close the at least one valve to prohibit beverage to flow from the at least one conduit to the beverage outlet when the container is in a no-pour orientation.

In some embodiments, the controller may be arranged to control the at least one valve to dispense a defined amount of beverage from the container. For example, if a user tilts a bottle so as to conventionally pour from the bottle, the system may automatically dispense a defined amount of beverage, such as 6 ounces, and stop dispensing even if the bottle is kept in a pour orientation. To dispense another serving, the user may be required to put the bottle in a no-pour orientation and then again to a pour orientation. In some embodiments, the controller may be arranged to control the at least one valve in two modes including a first mode for maximized beverage dispensing speed and a second mode for minimized pressurized gas usage. This may allow a user to control the rate at which beverage is dispensed, or to conserve dispensing gas as needed.

In some embodiments, a container-mounted beverage dispensing system includes at least one conduit to deliver gas into a container holding a beverage and to receive beverage from the container for dispensing in a user's cup, and at least one valve to control gas flow into the container or beverage flow out of the container via the at least one conduit. Arrangements for the at least one conduit and valve discussed above may be employed, for example, such as single or multi-lumen needles, a gas control valve, a beverage control valve, etc. A container orientation sensor may detect rotation of the container about its longitudinal axis while in a pour orientation, and a controller may be arranged to control the at least one valve to prohibit gas or beverage flow in response to rotation of the container about the longitudinal axis while in the pour orientation. Thus, for example, a user may rotate a bottle about its longitudinal axis while the bottle is held in a pour orientation and the system may stop beverage dispensing and/or stop gas delivery into the bottle. This arrangement may help the user better stop dispensing and prevent dripping from the bottle. Such a control arrangement may be used with the feature of controlling dispensing based on a container's pour/no-pour orientation as discussed above, or used independently of such a feature.

In another embodiment, a container-mounted beverage dispensing system may include a controller arranged to determine a volume of beverage in the container based on a change in pressure measured by a pressure sensor over a time period that pressurized gas is delivered to the container or over a time period that beverage is dispensed from the container. For example, the controller may detect a rate at which pressure in the container increases while gas is delivered to the container and based on the rate of pressure increase, determine an amount of liquid beverage in the container. In another embodiment, the controller may detect a rate at which pressure decreases in the container during beverage dispensing, and based on this information determine an amount of beverage in the container. In some embodiments, the controller may determine an amount of beverage dispensed, such as by determining an amount of time that a beverage dispense valve is open to allow beverage to be dispensed. In cases where a flow rate of beverage dispensing is known, e.g., based on gas pressure in the container, the controller may determine an amount of beverage dispensed and subtract that amount from an initial amount of beverage in the container.

In some embodiments, the controller may be arranged to receive information regarding an identity of a container to which the system is mounted, and the controller may store an amount of beverage in the container. This information may be useful where the system is used to dispense beverage, is disengaged from the container, and then reengaged at a later time to dispense beverage. The controller may recall the amount of beverage remaining in the container and control dispensing accordingly, e.g., by controlling gas flow into the container based on an amount of beverage remaining. In some cases, the controller may be arranged to determine an amount of beverage remaining in the container during dispensing based on an amount of gas delivered to the container. For example, the controller may determine an amount of gas delivered to the container based on a time that a gas control valve is open to deliver pressurized gas to the container. Where the gas is pressure regulated or other characteristics of gas flow rate can be known, the controller may determine an amount of gas delivered based on the flow rate and open time for the gas valve.

In some embodiments, a container-mounted beverage dispensing system may include at least one conduit to deliver gas into a container holding a beverage and to receive beverage from the container for dispensing in a user's cup, and at least one valve to control gas flow into the container via the at least one conduit. Arrangements for the at least one conduit and at least one valve discussed above may be employed. A gas cylinder may be fluidly coupled to the at least one conduit, and a controller may be arranged to determine a pressure in the gas cylinder based on an amount of time that the at least one valve is open to deliver gas into the at least one container. For example, a pressure sensor may be used to detect a pressure indicative of gas pressure in the container, and the controller may determine a pressure in the gas cylinder based on an amount of time that the at least one valve is open to deliver gas into the container and a gas pressure in the container. For example, lower gas cylinder pressures may correspond to a lower gas flow rate, and thus a longer time to pressurize a gas space in a container than a gas cylinder with a higher pressure.

Various exemplary embodiments of the device are further depicted and described below.

BRIEF DESCRIPTION OF THE DRAWINGS

Aspects of the invention are described with reference to various embodiments, and to the figures, which include.

DETAILED DESCRIPTION

Figure 1:
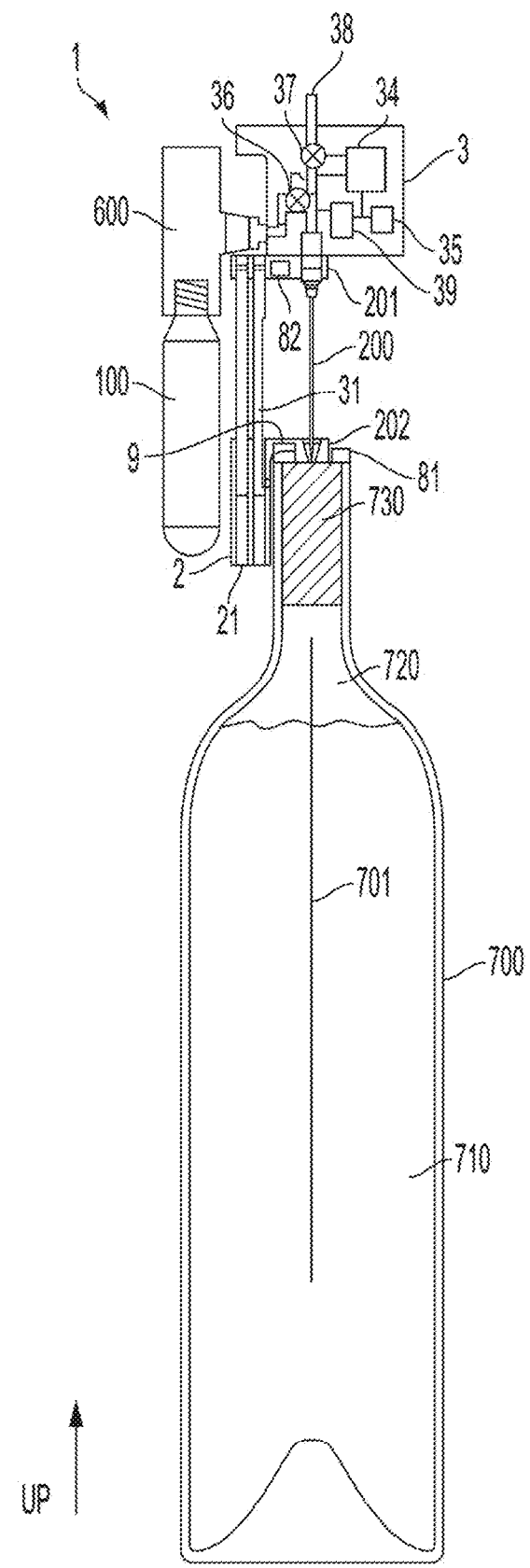
FIG. 1 shows a schematic view of a beverage dispensing device in preparation for introducing a conduit through a closure of a beverage bottle.

Aspects of the invention are described below with reference to illustrative embodiments, but it should be understood that aspects of the invention are not to be construed narrowly in view of the specific embodiments described. Thus, aspects of the invention are not limited to the embodiments described herein. It should also be understood that various aspects of the invention may be used alone and/or in any suitable combination with each other, and thus various embodiments should not be interpreted as requiring any particular combination or combinations of features. Instead, one or more features of the embodiments described may be combined with any other suitable features of other embodiments. For example, different clamp, latch and sensor configurations are discussed below, and it should be understood that various combinations of clamp, latch and/or sensor features may be made.

FIGS. 1-4 show schematic views of one embodiment of a beverage dispensing device (or extractor) 1 that incorporates one or more aspects of the invention. Generally, the device 1 is used to insert a needle into a beverage container 700, inject gas into the container 700 via the needle, and dispense beverage forced out of the container 700 by the injected gas or other pressure in the container. This illustrative device 1 includes a body 3 with an attached source of pressurized gas 100 (such as a compressed gas cylinder) that provides gas under pressure (e.g., 2600 psi or less as dispensed from the cylinder) to a regulator 600. In this arrangement, the cylinder 100 is secured to the body 3 and regulator 600 by a threaded connection, although other configurations are possible, such as those described below and/or in U.S. Pat. Nos. 4,867,209; 5,020,395; 5,163,909 and 9,810,375 which are hereby incorporated by reference with respect to their teachings regarding mechanisms for engaging a gas cylinder with a cylinder receiver. The regulator 600 is shown schematically and without detail, but can be any of a variety of commercially available or other single or multi-stage pressure regulators capable of regulating gas pressures to a pre-set or variable outlet pressure. The main function of the regulator 600 is to provide gas at a pressure and flow rate suitable for delivery to the container 700 (such as a wine bottle), e.g., so that a pressure established inside the container 700 does not exceed a desired level. In other embodiments, no pressure regulation of the gas released from the cylinder 100 need be done, and instead, unregulated gas pressure may be delivered to the container 700.

In this embodiment, the body 3 also includes at least one valve to control the flow of gas and/or a flow of beverage from the container 700. In this embodiment, a gas control valve 36 is provided to control the flow of gas from the gas source 100 to a flow path in fluid communication with the interior of the container 700, and a beverage control valve 37 to control the flow of beverage from the container 700 to a dispensing outlet 38. (In some embodiments, the dispensing outlet 38 or a portion of the outlet 38 such as a tube may be removable or replaceable, e.g., for cleaning.) However, other arrangements are possible, e.g., a single valve may control the flow of both gas and beverage (e.g., using a three-way valve), a single valve may be used to control gas flow only (e.g., a beverage flow conduit may be always open from the container interior to the dispensing outlet and beverage may flow as gas is introduced into the container), or a single valve may be used to control beverage flow only (e.g., gas flow from the gas source 100 to the container 700 may be always open with the device 1 engaged with a container 700 and beverage flow may be controlled by opening/closing a beverage control valve only). One or both valves 36, 37 may be controlled by a controller 34, i.e., control circuitry. For example, the controller 34 may detect when the device 1 is engaged with a container 700, e.g., by detecting that the needle has been inserted through a cork or a device clamp is engaged with a container neck, and then control the valves accordingly. Where not controlled by a controller 34, the valves 36, 37 may be manually operable by a user, and/or a user may provide input to the controller 34 via a user interface (button, touch screen, etc.) to cause the valves to open and/or close. As another option, operation of the valves may be tied together, whether mechanically or via electronic control, e.g., so that when one valve is opened, the other valve is closed, and vice versa, or so that when one valve is open the other valve is open as well (such as when using a two lumen needle).

Figure 2:
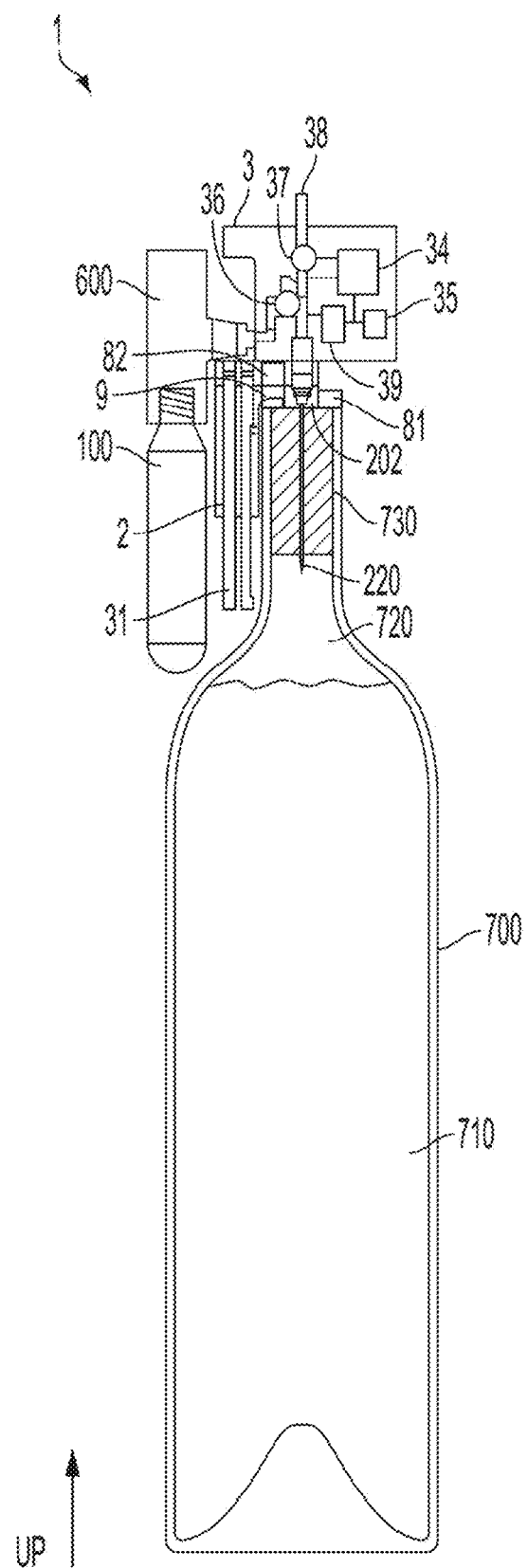
FIG. 2 shows the FIG. 1 embodiment with the conduit passed through the closure.
Figure 3:
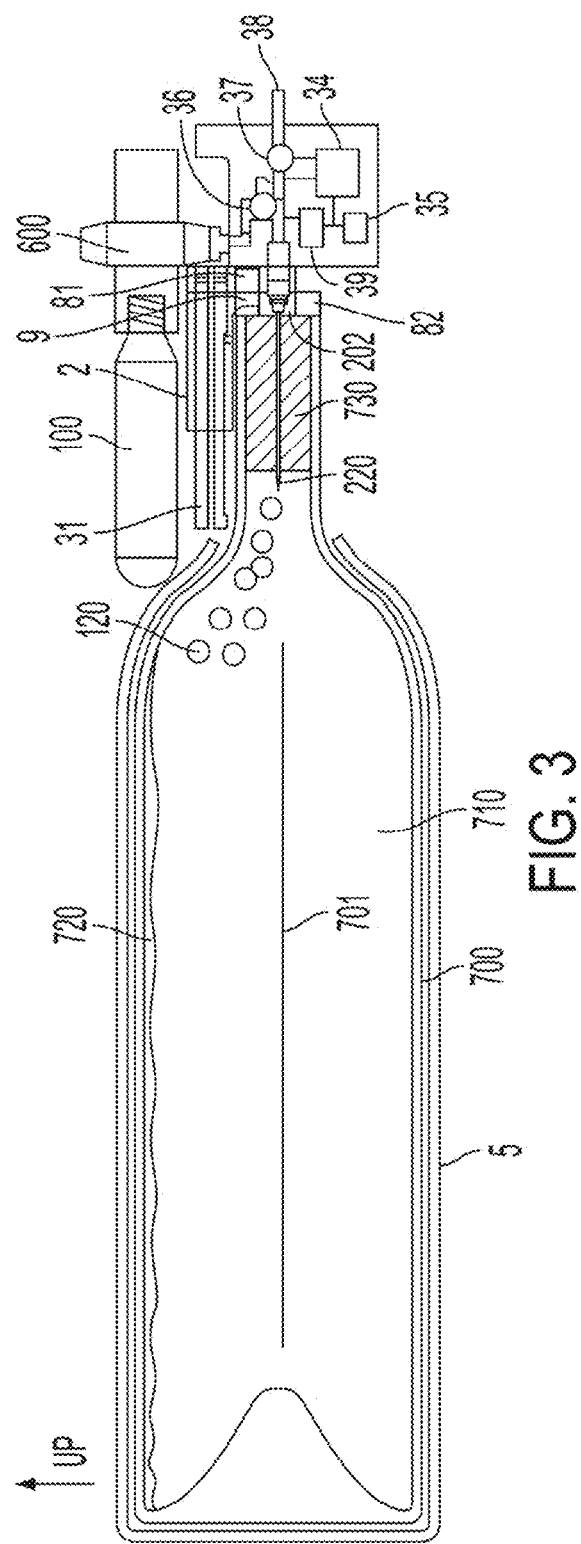
FIG. 3 shows the FIG. 1 embodiment while introducing gas into the bottle.
Figure 4:
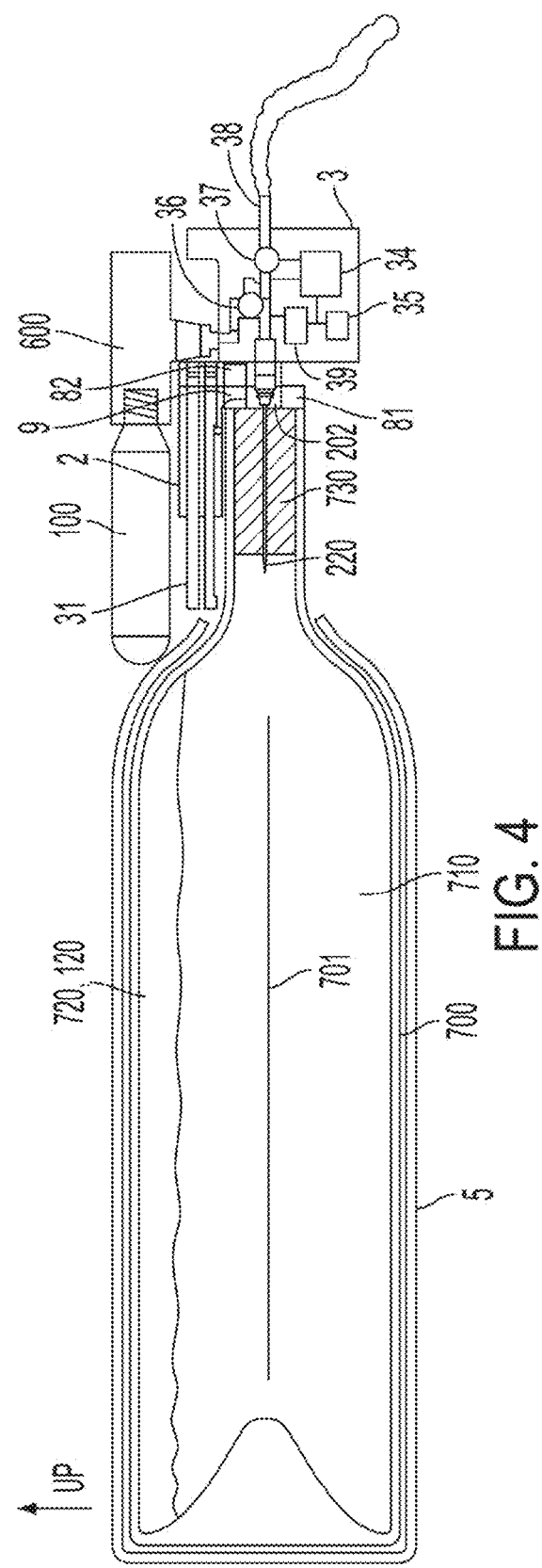
FIG. 4 shows the FIG. 1 embodiment while dispensing beverage from the bottle.

To introduce gas into the container 700 and extract beverage, at least one conduit is put in fluid communication with the interior of the container 700. In this embodiment, a needle 200 attached to the body 3 is inserted through a cork or other closure 730 that seals an opening at a neck of the container 700, as shown in FIG. 2. In this illustrative device 1, the needle 200 includes one or two lumens or conduits with a needle opening 220 along a sidewall of the needle near the needle tip. While the needle 200 may be inserted into and through the cork or other closure 730 in different ways, in this embodiment, the device 1 includes a base 2 (which may be secured to the container 700 by a clamp as discussed below) with a pair of channels 21 that receive and guide movement of respective rails 31 of the body 3. Thus, movement of the body 3 and attached needle 200 relative to the container closure 730 may be guided by the base 2, e.g., the body 3 may slide relative to the base 2 between an upper position and a lower position to move the needle 200 into/out of the closure 730. In addition, movement of the needle 200 may be guided by a needle guide 202 that is attached to the base 2 and positioned over the closure 730. To insert the needle 200 through the closure 730, a user may push downwardly on the body 3 while maintaining the base 2 and the container 700 at least somewhat stationary relative to each other. The needle 200 will pass through the closure 730, guided in its motion, at least in part, by the guided motion of the body 3 relative to the base 2 (e.g., by the rails 31 and channels 21). Other arrangements for guiding movement of the body 3 relative to the base 2 are possible, such as providing one or more rails on the base 2 which engage with a channel or other receiver of the body 3, providing an elongated slot, channel or groove on the body or base which engages with a corresponding feature (e.g., a tab) on the other of the body or base and allows for sliding movement, a linkage that connects the body and base together and allows for movement of the body to insert the needle into the closure, and others.

With the needle 200 suitably inserted as shown in FIG. 2, a needle opening 220 at the needle tip may be positioned below the closure 730 and within the enclosed space 720 of the container 700. This allows fluid communication between the interior of the container 700 and one or more conduits of the needle 200. In embodiments where a needle 200 includes one lumen or conduit, the valves 36, 37 may be controlled to alternately provide pressurized gas 120 into the container 700 and allow beverage 710 to flow from the container 700. (See FIG. 3.) For example, gas may first be introduced into the container 700 via the single conduit to establish a pressurized condition in the container 700, and then gas flow may be stopped and pressurized beverage may be permitted to flow out of the single conduit to the dispensing outlet. Where the needle 200 includes two lumens or conduits (or two or more needles are used), one or more conduits may be dedicated to gas flow into the container and one or more other conduits may be dedicated to beverage flow. Thus, the gas control valve 36 may control gas flow into the gas conduit(s), and the beverage control valve 37 may control beverage flow from the beverage conduit(s). Alternately, only one of the valves 36, 37 need be provided to control beverage flow, e.g., the gas control valve 36 may be opened/closed and beverage may flow out of the container and to the dispensing outlet 38 via a dedicated, always open beverage conduit depending on pressure in the container. It should be appreciated that use of a needle or other structure capable of penetrating a cork or other closure is not necessary. Instead, any suitable hose, pipe, tube or other conduit may be used as a needle, e.g., a cork may be removed and the conduits fluidly coupled to the container 700, e.g., by a plug or cap through which the conduit(s) extend.

In accordance with an aspect of the invention, the dispensing device may include a container sensor arranged to detect that the container neck is engaged by the base, and a needle sensor arranged to detect that the needle is inserted through the closure of the beverage container. The container and needle sensors may be arranged in a variety of different ways. In this illustrative embodiment, the device 1 includes a container sensor 81 that is attached to the needle guide 202 and that detects when a top of a container neck is near or in contact with the needle guide 202. The needle guide 202 may function as a stop that limits travel of the container neck relative to the base 2 in a vertical direction as viewed in FIGS. 1 and 2 (i.e., a direction along a length of the needle 200 or along a pathway the needle travels through the closure), and the container sensor 81 may detect when the top of the container neck contacts the needle guide 202. Of course, a needle guide 202 is not required, and a stop may be provided to help position the top of the container neck relative to the base 2 without providing a needle guiding function. In this embodiment, the container sensor 81 includes a switch that is actuated when the container neck is suitably positioned relative to the stop/needle guide 202, e.g., when the top of the container neck contacts the needle guide 202, the switch is closed, opened or otherwise changes in detectable state. Other arrangements are possible for the container sensor 81, however, including an ultrasonic sensor (e.g., that detects proximity of the container neck), a Hall effect sensor (e.g., that detects movement of a magnetic element that is moved by contact with the container neck), an optical detector (e.g., that detects ambient light that is blocked by the top of the container neck), and others. The container sensor 81 may also be positioned in any suitable way to detect engagement with the base. For example, the base 2 may include a clamp (discussed in more detail below), and the container sensor 81 may include a sensor to detect when the clamp engages the container neck, e.g., a strain gage may detect when force is exerted on the clamp to engage the container, a switch may detect when arms of a clamp are forced into engagement with a container neck, and others. In another arrangement, the container sensor 81 may be actuated by a user, e.g., a user presses a button when the device 1 is suitably engaged with a container.

The controller 34 may control the gas valve 36 and/or the beverage valve 37 and/or other portions of the device 1 based on a detection state of the container sensor 81. For example, the controller 34 may not allow the delivery of gas through the gas valve 36 unless the container sensor 81 detects that a container 700 is suitably engaged with the base 2. This may help ensure that gas is only released when appropriate, e.g., when a container is suitably engaged with the device 1 to receive pressurized gas. Alternately, or in addition, the controller 34 may disable a display unless the container sensor 81 detects engagement with a container 700, or may indicate on the display (such as an indicator light, multi-pixel display with associated touch screen, etc.) whether the device 1 is engaged with a container or not. This may aid a user in ensuring a container is properly engaged with the device 1. The controller 34 may also use the detection state of the container sensor 81 to "wake" one or more systems of the device 1, e.g., if the container sensor 81 detects a container is engaged, a display may indicate that the device 1 is powered up and ready for operation, or provide instructions such as an indication to insert the needle 200 into the closure 730, and so on. The controller 34 may perform status checks on the device 1 in response to the container sensor 81 indication, such as a check to determine if suitable gas pressure is present in a cylinder 100 to dispense beverage, whether battery power (if used) is suitable for operation, etc., and provide one or more messages or other display to a user.

As noted above, the device 1 may also include a needle sensor 82 that detects whether the needle is inserted through the closure of the beverage container. The needle sensor 82 may be implemented in a variety of different ways, but in this embodiment includes a sensor (such as a switch) that detects when the body 3 is moved to a lower position relative to the base 2, e.g., as shown in FIG. 2, which may indicate that the needle 200 has been inserted through a closure 730. As an example, a switch may be actuated by contact of the switch with the needle guide 202 when the body 3 is moved to the lower position. If the body 3 is freely movable relative to the base 2, the sensor 82 indicating that the body 3 is in a lower position relative to the base 2 may not necessarily indicate that the needle 200 has been inserted through a closure, e.g., because the base 2 may not have been properly engaged with a container 700 before the body 3 and needle 200 were moved to the lower position. In some embodiments, the controller 34 may be arranged to first determine whether the base 2 is engaged with a container neck based on information from the container sensor 81, and then determine that the needle 200 has been inserted through the closure 730 only if the container sensor 81 determines that the container 700 remains engaged with the base 2 while the body 3 and needle 200 are moved to the lower position relative to the base 2. Alternately, the needle sensor 82 may include other or additional sensors to determine that the needle 200 has been inserted through a closure, such as a force sensor that detects suitable force was exerted on the needle 200 to indicate that the needle 200 has been inserted through a closure, or to detect that a distal end of the needle 200 passed through a closure and emerged from a lower end of the closure (e.g., by detecting a change in force on the needle distal end, and/or detecting ambient light at the distal end which is blocked while traversing the closure but is present upon the distal end emerging from the closure, and/or detecting liquid at the needle distal end by conductive or capacitive sensor, etc.).

In response to detecting that the needle 200 has been inserted through a closure 730, the controller 34 may take various actions, such as permitting the gas valve 36 to deliver pressurized gas to the needle 200 only if the needle has been inserted through a closure but not before (whether the valve 36 is operated automatically or manually), enabling beverage dispensing (e.g., by allowing the beverage valve 37 to operate or to be operated if the valve can be manually operated), causing a display on the device 1 to indicate that the system is ready to dispense beverage, providing a display (whether visual and/or audible) to the user how to dispense beverage, performing system status checks, and others. As noted above, the controller 34 may use information from the container sensor 81 to determine that the needle 200 has been inserted through a closure 730 (e.g., to determine a container is engaged with the base 2 while the body 3 and needle 200 are moved to the lower position relative to the base 2), or may use information from the needle sensor 82 alone.

In accordance with another aspect of the invention, the dispensing device may include a latch that releasably locks the body in the upper position, e.g., until the container neck is engaged by the base, and the latch may be arranged to release the body for movement from the upper position to the lower position to insert the needle through the closure. The latch may be manually operated, e.g., a user may engage the base 2 with a container neck such as by employing a clamp to secure the device to the container neck, and then the user may release the latch so that the body 3 and needle 200 can be moved downwardly to the lower position to insert the needle 200 through the closure 730. This may enable the user to keep the body 3 in an upper position until the user is ready to insert the needle 200 into the closure 730. For example, as can be seen in FIG. 1, a distal end of the needle 200 may be located within a needle guide 200 or other shield when the body 3 is in an upper position relative to the base 2. This may help prevent accidental contact with the distal end of the needle 200, which may be sharp in some cases. The distal end of the needle 200 may be shielded with the body 3 in the upper position until the user is ready to move the needle 200 into the closure 730, e.g., until after the device 1 is secured to a container with the top of the container neck in contact with the needle guide 202. As a result, when the needle 200 is moved downwardly, the distal end of the needle 200 is shielded from contact with a user throughout its entire travel through the closure 730. The user may disengage or release the latch by pressing a button, inserting and turning a key (which may prevent use by people who do not have the key), entering a security code into a user interface of the controller 34 (which may electronically release the latch by engaging a solenoid or other electromechanical device), and others.

In some embodiments, the latch may be released by suitable engagement of the base 2 with a container neck. For example, the base 2 may include a clamp and the latch 9 may be arranged so that when the clamp is engaged with the container neck, the latch 9 is released to allow movement of the body 3 and needle 200 relative to the base 2. In one embodiment, the base 2 may include a stop, such as the needle guide 202, that contacts a top of the container neck when the container neck is fully received by the clamp and engaged by the base 2. The latch 9 may include a spring-loaded plunger mounted to the needle guide 202 that engages with one of the rails 31 or other portion of the body 3 to prevent the body 3 from moving relative to the base 2. However, when the needle guide 202 contacts a container neck, the plunger may be moved against the spring bias so the plunger disengages from the rails 31 or other body 3 portion to allow movement of the body 3. Other arrangements are possible for the latch 9. For example, the latch 9 may include a solenoid-operated plunger that engages with the rails 31 or other body portion, and when the controller 34 determines that a container neck is suitably engaged based on information from the container sensor 81, the controller 34 may operate the solenoid to release the latch 9. Alternately, a user may provide input to the controller 34 via user interface (a microphone, touch screen icon, press button, etc.) and in response the controller 34 may release the latch 9. In another arrangement, a latch actuator associated with a clamp may be moved when the clamp exerts a suitable force on the container neck to engage with the neck. Movement of the actuator may cause a linkage or other mechanism to move a plunger or other latch element to release the body 3 for movement. Enabling latch release based on full engagement of a container neck by a clamp may help ensure that the base 2 is properly engaged with a container before the needle 200 is released for movement, helping to ensure the needle passes through the closure 730 without problem or difficulty.

As will be appreciated, a beverage dispensing device may benefit from a clamp or other arrangement configured to engage the device with a bottle, e.g., by clamping the device to the neck of a bottle. For example, the device can include one or more clamp arms that are movably mounted to the device and are arranged to engage with a bottle, e.g., to support the device on the bottle during use. In one illustrative embodiment, a base includes a clamp with at least one clamp arm that defines a receiving space for the container neck. The at least one clamp arm may define, at least in part, an entry opening to the receiving space at a bottom of the clamp. Thus, the clamp may fully receive the container neck into the receiving space by inserting the container neck into the entry opening from the bottom of the clamp and moving the clamp downwardly relative to the container neck. This action inserts the container neck into the receiving space so that the clamp engages the container neck. The clamp may secure the base to the container neck in different ways, such as by securing a ratcheting strap, buckle, threaded fastener, etc., and in some embodiments the at least one clamp arm may be arm spring biased to move relative to the base to exert an engagement force on the container neck. Receiving the container neck into the receiving space may move the at least one clamp arm against the spring bias so that the at least one clamp arm exerts a clamping force on the neck when in the receiving space. The spring biased nature of the at least one clamp arm may also allow the clamp to accommodate differently sized container necks.

To aid in receiving the container neck into, and/or removing the neck from, the receiving space, the at least one clamp arm may include a container engagement surface, e.g., that extends vertically or in a direction in which the container neck moves relative to the at least one clamp arm during engagement/disengagement. The engagement surface may have a lower portion that ramps or slopes inwardly and upwardly relative to the receiving space, and the lower portion may be arranged to allow the clamp to be pushed downwardly on the container neck to receive the container neck in the receiving space. The ramped or sloped shape of the lower portion may function to move the at least one clamp away from the container neck as the neck is received into the receiving space while also exerting an engagement force on the container neck. The engagement surface may also assist in removing the clamp from the container neck, e.g., by pulling upwardly on the clamp relative to the container. The engagement surface may include an upper surface that is ramped or sloped upwardly and outwardly relative to the receiving space to assist in removing the neck from the receiving space.

Figure 5:
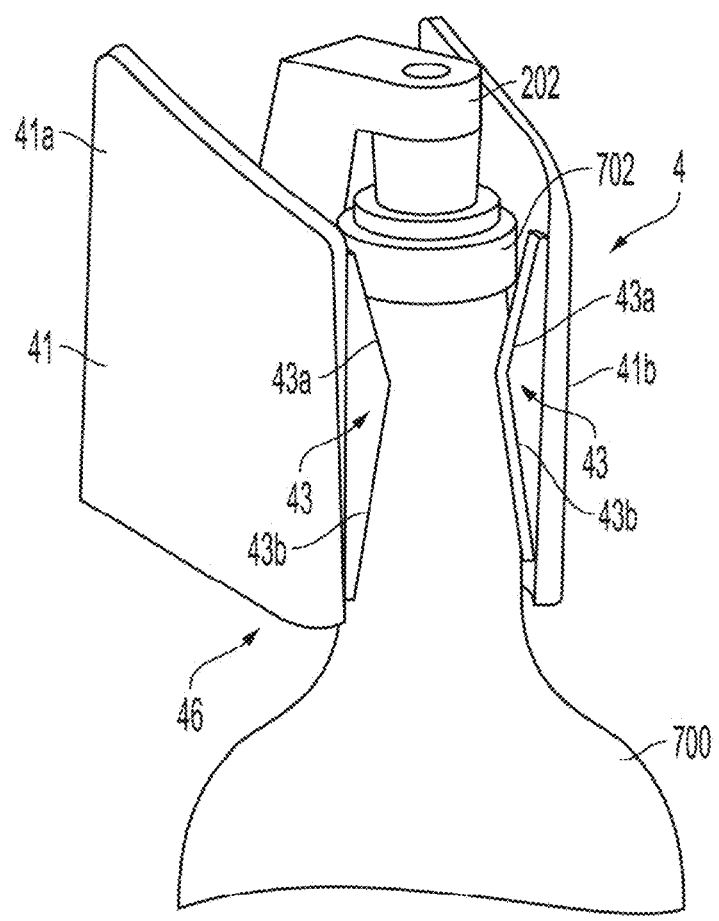
FIG. 5 shows a perspective side view of a beverage dispensing device in an illustrative embodiment that includes a clamp and engagement surfaces.
Figure 6:
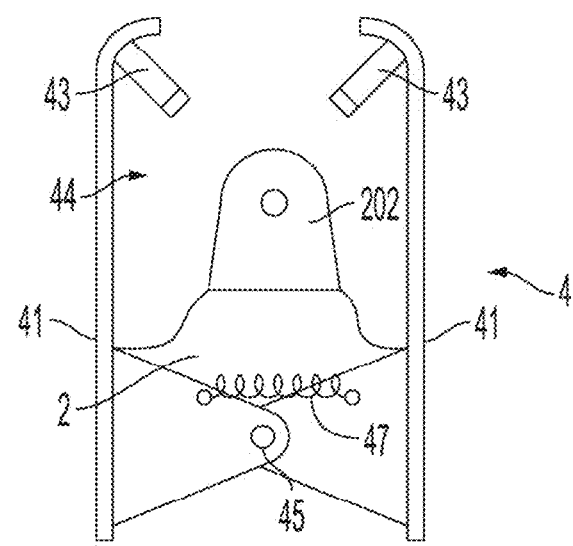
FIG. 6 shows a bottom view of the dispensing device of FIG. 5.

FIG. 5 shows an illustrative embodiment of a device 1 having a base 2 with a pair of clamp arms 41, but it should be appreciated that a single clamp arm may be provided instead of a pair. In this embodiment, the clamp arms 41 each include a distal portion 41b and the clamp arms 41 are arranged to essentially wrap around a container neck. If only one clamp arm 41 was provided, the clamp arm 41 may wrap to a further extent around the container neck than the arms 41 in FIG. 5 and the one clamp arm 41 may cooperate with a portion of the base 2 to engage a container neck. The clamp arms 41 together with a portion of the base 2 define a receiving space 44 in which the container neck is engaged by the clamp, and an entry opening 46 is defined at the bottom of the clamp, e.g., the lower portion of the distal portions 41b define the entry opening 46, as can be seen in FIG. 6. This allows the clamp arms 41 to be placed over a container neck so the neck can be received between the arms 41. Pushing down on the clamp arms 41 may fully receive the container neck into the receiving space 44, e.g., until the top of the container neck contacts the needle guide 202, stopping further movement of the container neck relative to the clamp arms 41. The clamp arms 41 may be spring biased to move toward each other, even relatively strongly biased toward each other, e.g., so that a person cannot typically grip the arms 41 to move them away from each other by hand. This strong spring bias may aid in securing the clamp 4 and the base 2 to the container neck. The spring bias may be provided by a spring 47, which urges the clamp arms 41 to move toward each other and engage the container neck. In this embodiment, the arms 41 are mounted to the body 2 by a single pivot pin 45, but other arrangements are possible. For example, each arm 41 may be mounted to the body 2 by its own corresponding pivot pin 45, and a torsion spring 47 may be provided at each pivot pin 45 to bias the corresponding arm 41 toward the other arm 41.

FIGS. 5 and 6 also illustrate that the clamp arms 41 each include an engagement surface 43 that can contact the container neck and aid in the clamp engaging with the neck. In this embodiment, the arms 41 define a receiving space 44 between the arms 41 where the container neck is received and engaged by the clamp 4. The arms 41 define an entry opening 46 at a bottom end of the clamp 4, i.e., the receiving space 44 is viewed through the entry opening 46 in FIG. 6. The entry opening 46 may be sized and shaped to allow the top of a container neck to be introduced between the arms 41 so that the arms 41 can be forced downward onto the container neck. The engagement surfaces 43 may contact the container neck, e.g., at a lip 702, to aid in entry of the container neck into the receiving space 44. In this embodiment, the engagement surfaces 43 extend vertically on the respective clamp arm 41, e.g., to help guide movement of the container neck in its travel into the receiving space 44. The engagement surfaces 43 may have a relatively hard, low-friction surface to help allow the clamp arms 41 engage the neck while allowing the neck to shift in position relative to the clamp arms 41. A lower portion 43b of the engagement surfaces may slope inwardly and upwardly relative to the receiving space 44 and may contact the container neck to move the arms 41 away from each other to enlarge the receiving space 44 and allow the container neck to move into the receiving space 44. The sloped nature of the lower portion 43b may allow the clamp 4 to accommodate differently sized and shaped container necks as well as provide relatively gradual movement of the clamp arms 41 away from each other against the spring bias urging the arms 41 together as the container neck is received. As noted above, the arms 41 may be biased toward each other by a relatively high force of the spring 47. However, the sloped arrangement of the engagement surfaces 43 may provide suitable mechanical advantage to a user pressing downwardly on the clamp 4 to force the arms 41 apart and seat the container neck in the receiving space 44. The container neck may be received until contacting a needle guide 202 or other stop, which prevents further movement of the container neck into the receiving space 44.

As can be seen in FIG. 5, the engagement surfaces 43 may include an upper portion 43a the ramps or slopes upwardly and outwardly relative to the receiving space 44. This arrangement may provide at least two functions, i.e., helping maintain the container neck seated at a fully received position in the receiving space 44 and/or aiding in removal of the clamp 4 from the container neck. To maintain the container neck seated at a fully received position in the receiving space 44, the upper portion 43a may exert a radially inward and upward force on the container neck, e.g., at the lip 702, (or from the reference point of the container, a radially outward and downward force on its clamp arm 41) that helps keep the container neck in contact with the needle guide 202 or other stop. That is, while both the upper and lower portions 43a, 43b may exert a radially inward force on the container neck, the upper portion 43a may exert an upward force on the container neck due to its sloping upwardly and outwardly relative to the receiving space 44. This may help urge the container neck to move upwardly relative to the clamp 4 (or urge the clamp 4 to move downwardly relative to the container 700 depending on the frame of reference). To aid in removal of the clamp 4, the upper portions 43a may allow the clamp 4 to be removed from the container neck by simply pulling upwardly on the clamp 4 relative to the container 700. In the same way that the lower portions 43b may assist in receiving the container neck into the receiving space 44 by forcing the clamp 4 downwardly onto the container, the upper portions 43a my assist in removal of the neck from the receiving space 44. For example, the upper portions 43a may contact a lip 702 of the container neck and urge the arms to move outwardly and away from the container neck as the clamp 4 is move upwardly relative to the container 700. The sloped shape of the engagement portions 43 may provide mechanical advantage that allows a user to overcome even relatively robust biasing of the spring 47 urging the arms 41 together. Also, once contact of the engagement surfaces 43 transitions from the upper portion 43a to the lower portion 43b, the spring 47 bias may help push the container neck out of the receiving space 44 since it may exert a radially inward and downward force on the container, e.g., at the lip 702 (or a radially outward and upward force on the clamp arm 41). In this embodiment, the transition between the upper and lower portions 43a, 43b of the engagement surfaces 43 occurs at a point or vertex, but the transition may include a flat section that exerts a radial inward force on the container, but neither an upward nor downward force on the container. When the container neck is fully received at the receiving space 44, the transition area, whether a point/vertex, flat section or other, may cooperate with the upper portion 43a to help stabilize the clamp 4 on a container neck. That is, the upper portion 43a may contact a lip 702 of the container neck, while the transition area may contact a portion of the neck below the lip 702, providing each engagement surface 43 with two points of contact with a container neck. The engagement surface 43 could be shaped to provide additional and/or larger areas of contact with a container neck if desired.

Combining various aspects of the invention together may provide a beverage dispensing device that is convenient for a user. For example, a device 1 that includes a latch 9 which locks a body 3 and needle 200 in an upper position until a container neck is properly engaged with the base, and a clamp that can be engaged by pressing downwardly onto the container neck may allow a user to grasp and press downwardly on the body 3 and/or base 2 to engage the device 1 with a container. This may be done without concern that the body 3 will move relative to the base 2, at least until the base 2 is suitably engaged with the container neck. Also, this arrangement may allow the user to engage the device 1 with a container and insert a needle into the container closure in a single operation in which the device 1 first engages the container, and then the needle is inserted after the container is fully engaged with the base 2. Further incorporating a container sensor 81 and/or a needle sensor 82 may provide additional advantages, such as enabling the device 1 automatically start a dispensing mode only after the device 1 is properly engaged with a container and the needle 200 is inserted through the closure.

Figure 7:
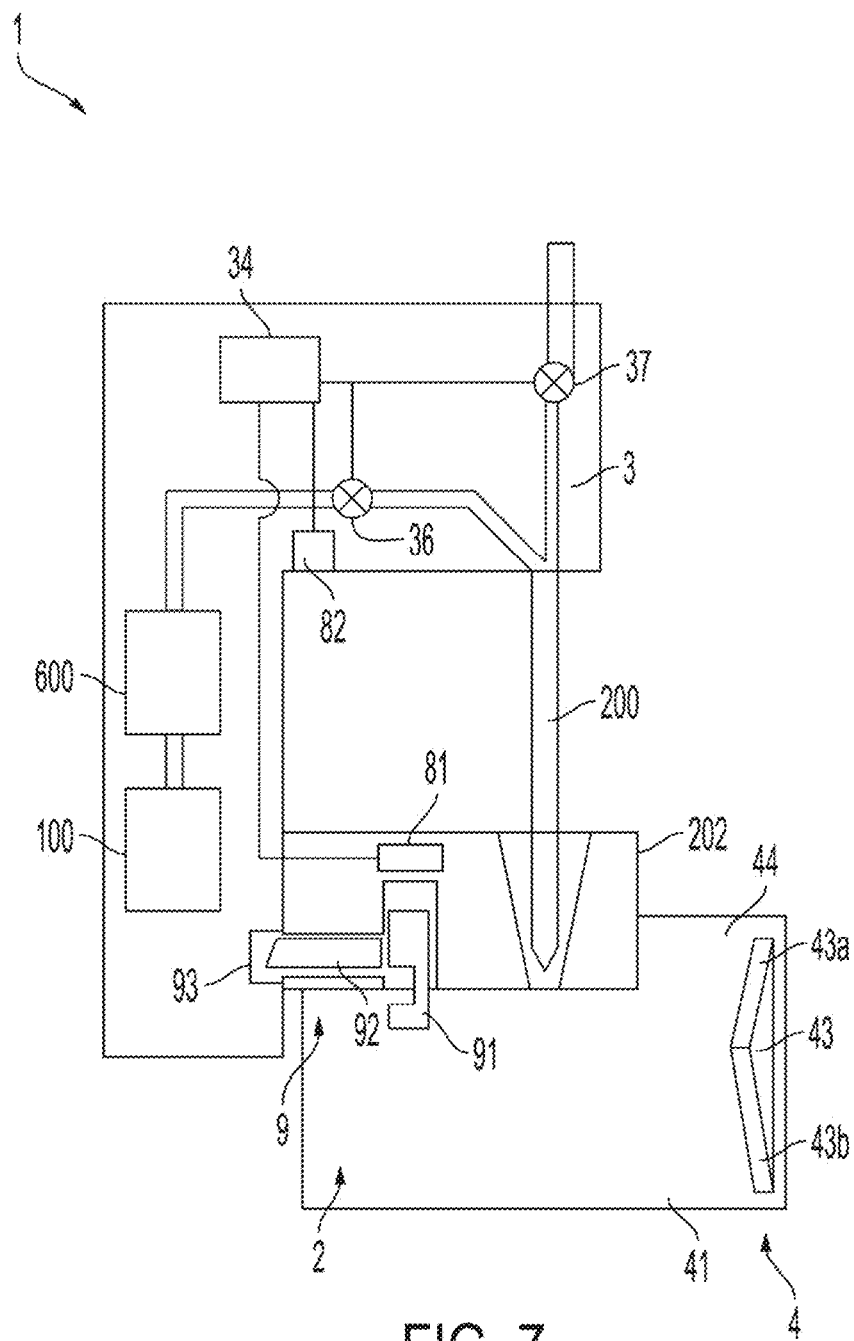
FIG. 7 shows a schematic view of a dispensing device including a body latch, container and needle sensors and clamp having an engagement surface.

FIG. 7 shows a schematic diagram of a device 1 that incorporates a clamp arm with an engagement surface 43, a latch 9 to lock the body 3 in an upper position relative to the base 2, and container and needle sensors 81, 82 to detect whether a container is engaged with the base 2 and if a needle 200 is inserted into a closure 730. This is just one illustrative embodiment, and as noted above the components depicted may be implemented in a variety of different ways. In this illustrative embodiment, a latch 9 is implemented by a movable latch bolt 92 that is mounted to the base 2 and can move to the left under a spring bias to engage with a latch slot 93 in the body 3 when the body 3 is in an upper position relative to the base 2 as shown in FIG. 7. A latch slide 91 is mounted to the base 2 and is spring bias to move downwardly in the position shown in FIG. 7 to block movement of the bolt 92 to the right. Thus, the body 3 is prevented from moving relative to the base 2 so long as the bolt 92 is engaged with the slot 93 and the slide 91 prevents movement of the bolt 92 to the right. This allows a user to grasp the body 3 and force the clamp 4 downwardly over a container neck so the container neck is received into the receiving space 44, e.g., as guided by one or more engagement surfaces 43 as discussed above. The engagement of the clamp 4 with the container may be performed without the body 3 moving downwardly relative to the base 2. However, the slide 91 is arranged so that when the top of a container neck (not shown) is fully received into the receiving space 44 of the clamp 4, the top of the container neck contacts the slide 91 and moves the slide 91 upwardly against the spring bias. This aligns a notch in the slide 91 with the bolt 92, allowing the bolt 92 to move to the right. The upper positioning of the slide 91 may be detected by a container sensor 81, which may include a switch that is actuated (closed or opened) by upward positioning of the slide 91. With the notch of the slide 91 aligned with the bolt 92, downward force on the body 3 relative to the base 2 causes a portion of the body 3 to contact a ramp on the end of the bolt 92, forcing the bolt 92 to move to the right and into the notch of the slide 91. This clears the latch 9 and the body 3 can continue downward movement relative to the base 2, thereby inserting the needle 200 as guided by the needle guide 202 into the closure of the container. When the body 3 is positioned in its lower position relative to the base 2, the needle 200 is fully inserted and the needle sensor 82 may detect that the body 3 is in its lower position, e.g., by a switch being actuated by contact with the base 2. The controller 34 may receive information from the container and needle sensors 81, 82, and in response take desired action, such as starting a dispensing operation, allowing manual or automatic operation of the valves 36, 37, and so on.

In this illustrative embodiment, the clamp arms 41 are pivotally mounted to the base 2 such that the arms 41 are normally biased to move toward each other, e.g., to clamp a bottle neck positioned between the arms 41. However, the clamp arms 41 may be movably mounted relative to the base 2 in other ways, such as by a linkage, living hinge, a sliding engagement (such as by having a portion of a clamp arm move in a channel of the base), and others. Also, one arm may be fixed to the base while the other is made movable (although in this embodiment the arms are still said to be moveable relative to each other). Torsion or other springs may be used to provide the biasing force (if provided at all) on the clamp arms 41. The clamping force of the clamp arms 41 may be sufficiently robust to support the device 1 on the bottle 700, or even to allow a user to lift and pour beverage from the bottle 700 by grasping and manipulating the device 1. The clamp arms 41 may also include proximal portions that can be grasped by a user and moved together (overcoming the biasing force of the spring 47) so that the arms 41 are moved away from each other to receive a bottle neck. For example, in this embodiment, a user may pinch the proximal portions together to position a bottle neck between the arms 41, and then release the proximal portions to allow the clamp arms 41 to clamp the bottle neck. However, other arrangements are possible as discussed above. In arrangements where the clamp arms 41 are biased to move apart or are not biased at all, a locking mechanism may be used to engage the clamp arms 41 to the bottle. That is, whether the clamp arms 41 are spring biased or not, movement of the arms may be restricted or otherwise controlled in some way by a locking mechanism. For example, the arms 41 may be secured together by a ratchet and pawl mechanism that allows the clamp arms 41 to move freely toward each other, but prevents movement of the arms 41 away from each other unless the pawl is first cleared from the ratchet. This arrangement may allow a user to securely clamp the arms 41 onto a bottle neck with the ratchet and pawl ensuring that the arms 41 will not move away from each other to release the neck until the user releases the pawl. In other embodiments, the arms 41 may be secured against movement away from each other in alternate ways, such as by a buckle and strap (with the strap secured to one arm 41 and the buckle secured to the other arm 41), a screw and nut (in which the screw engages one arm 41, the nut engages the other arm 41, and the screw and nut threadedly engage each other to secure the arms 41 together), a hook-and-loop closure element that spans across the arms 41 at their distal end, or other arrangement suited to engage the arms 41 with the bottle 700. For example, a locking mechanism may include a buckle similar to that found in some ski boots. In this embodiment, the locking mechanism includes a handle that is pivotally mounted to a clamp arm 41 and carries a bail.

The bail may be arranged to selectively engage with a bail-engaging slot formed in the other clamp arm 41. As noted above, a sensor 81 may be associated with a clamp arrangement to sense and indicate that the device 1 is engaged with a container. For example, a switch may be closed when the clamp is engaged with a container neck, indicating that the device 1 is engaged with a container. The controller 34 may use this information to control dispensing, e.g., the controller 34 may in response begin monitoring whether the container is in a pour orientation or not and control dispensing accordingly.

In some embodiments, after the beverage dispensing device is properly secured to a container, the dispensing device may detect whether the container is in a pour or no-pour orientation, and automatically control portions of the device to dispense beverage while in the pour orientation, but not while in the no-pour orientation. For example, the device 1 may include an orientation sensor 35 (see FIGS. 1-4) constructed and arranged to detect a pour condition when a bottom of the container 700 is positioned above an opening of the container 700 (e.g., where a closure 730 is located). Alternately, the orientation sensor 35 may detect a pour condition when a longitudinal axis 701 of the container 700 is rotated about a horizontal axis by at least 90 degrees, or other movement of the container 700 that represents beverage is to be dispensed from the container 700. To detect such conditions, the orientation sensor 35 may include one or more gyroscopes, accelerometers, mercury or other switches, etc., arranged to detect motion and/or position of the device 1 and container 700 relative to gravity. In another embodiment, the orientation sensor 35 may detect a pour condition when beverage is in contact with a needle 200 or other conduit arranged to receive beverage. For example, the orientation sensor 35 may include a conductivity sensor, float switch or other arrangement to detect the presence of liquid beverage at the distal end of the needle 200 or other conduit that receives beverage.

These conditions, or others, detected by the orientation sensor 35 can be used by the controller 34 to determine that the user has manipulated the container 700 to dispense beverage from the container 700, i.e., the container is in a pour orientation. In response, the controller 34 can control one or more valves to dispense beverage from the container 700. For example, in the illustrative embodiment of FIG. 3, the controller 34 may detect that the container 700 has been rotated 90 degrees or more relative to an upward direction (i.e., a direction opposite to the direction of local gravitational force) and open the gas valve 36 to deliver pressurized gas into the container 700. Thereafter, the controller 34 may close the gas control valve 36 and open the beverage control valve 37 to allow beverage to be dispensed via the dispensing outlet 38. This configuration allows the device 1 to use a single lumen needle 200 to dispense beverage from the container. As will be understood, the controller 34 may cause beverage to be dispensed intermittently, e.g., by alternately opening the gas control valve 36/closing the beverage control valve 37 to deliver pressurized gas into the container 700 and closing the gas control valve 36/opening the beverage control valve 37 to dispense beverage from the container 700. Where the needle 200 or other element has two conduits, the controller 34 may simultaneously open the gas control and beverage control valves 36, 37 to dispense beverage. As noted above, beverage dispensing can be controlled in other ways depending on a number of conduits in fluid communication with the container 700 and/or a valve arrangement. For example, if a two-lumen needle 200 is employed, the device 1 may include only a gas control valve 36 or only a beverage control valve 37, which is opened to dispense beverage and closed to stop dispensing.

The controller 34 may continuously, periodically or otherwise monitor the orientation information from the orientation sensor 35 and control beverage dispensing accordingly. For example, if the orientation sensor 35 detects that the container 700 is no longer in a pour orientation, the controller 34 may stop beverage dispensing, such as by closing the gas and/or beverage control valves 36, 37. If the device 1 is again detected to be in a pour orientation, beverage dispensing may begin again.

In some embodiments, the controller 34 may control an amount or volume of beverage dispensed for each pouring operation, e.g., for each time the device 1 is detected to be in a pour orientation and remains in the pour orientation for an extended period such as 1 second or more. For example, the controller 34 may be configured to dispense a predetermined amount of beverage, such as 1.5, 4 or 6 ounces/125 ml or 150 ml, for each pouring operation. In other arrangements, the controller 34 can receive user input to select one of two or more volume options, such as pouring a "taste" or relatively small amount, or pouring one or more larger volumes. Thus, the controller 34 may include a push button, voice control, or other user interface to receive selectable dispense volume information. Based on the selected pour volume, the controller 34 may control the operation of the valve(s) to dispense the selected amount. Note that controller 34 control of a dispense volume need not be coupled with an ability to detect whether a container is in a pour/no-pour orientation. Instead, a user may select a desired dispense volume and then press a button or other actuator to initiate dispensing. The controller 34 may stop dispensing when the selected volume has been dispensed, e.g., by closing a suitable valve.

The controller 34 can control how much beverage is dispensed in different ways. For example, the controller 34 may include a flow sensor arranged to detect an amount of beverage dispensed and control operation of the valve(s) based on information from the flow sensor. In another arrangement, the controller 34 may determine an amount of beverage dispensed based on a time that the beverage control valve 37 is open for dispensing. Where a pressure in the container 700 and/or other dispense conditions are known (e.g., a flow rate through a needle 200 may be relatively constant even for a relatively wide range of pressures in the container), a time-based control of beverage volume corresponding to an open time for the beverage control valve 37 may be sufficiently accurate. In another embodiment, the controller 34 may determine a flow rate from the container based on a pressure in the container 700, and thus may include a pressure sensor 39 to detect a value indicative of a pressure in the container 700. The pressure sensor 39 may have a sensor element positioned in the container (e.g., at an end of the needle 200), in a conduit between the gas source and the container, or in other suitable locations to provide an indication of pressure in the container 700. The pressure detected by the pressure sensor 39 may be used by the controller 34 to determine a flow rate of beverage from the container 700, and thus determine an amount of beverage dispensed (e.g., a flow rate of beverage out of the dispensing outlet 38 may be related to pressure in the container 700, and by multiplying the flow rate(s) by a dispense time, the dispense volume may be determined).

Information from the pressure sensor 39 may also be used by the controller 34 to control a pressure in the container 700 to be within a desired range. For example, the controller 34 may control pressure in the container 700 to be within a desired range to ensure that beverage is dispensed at a suitably high rate and/or at a known flow rate. In another arrangement, the controller 34 may control the pressure in the container 700 to be somewhat lower, e.g., to preserve gas provided from the gas source 100 and dispense at a slower flow rate. In some cases, a user may be able to set the device 1 to operate in different dispensing modes, such as "fast pour" or "save gas" modes in which the device 1 operates to dispense beverage at a maximum or other relatively high rate using a relatively higher pressure in the container 700 (a fast pour mode) or operates to dispense beverage in a way that uses as little dispensing gas as possible by using a relatively lower pressure in the container 700 (a save gas mode). Alternately, a user could interact with the controller 34 to adjust the dispense rate up or down. Again, the user could provide the dispense speed information by a user interface of the controller 34 or other means, and a selectable dispense rate feature may be used with or without dispense volume control, e.g., where the controller 34 dispenses a specified volume of beverage.

In another aspect of the invention, a dispensing device may be arranged to determine a volume of beverage remaining in a container, and in one embodiment the volume of beverage in the container may be determined based on a change in pressure over a time period that pressurized gas is delivered to the container. For example, the device 1 may include a source of pressurized gas 100 that is used to deliver gas into a container. The device 1 may measure a rate at which pressure increases in the container 700, and based on the pressure rate change determine an amount of beverage in the container. The pressure of gas provided to the container may be regulated, e.g., so that gas is provided at a relatively constant pressure to the container during the pressure rate change measurement. Pressure in the container may be measured, e.g., using a pressure sensor 39, and as will be understood, the rate change of pressure in the container will tend to be lower for containers having less beverage volume and larger gas volume inside the container. The controller 34 may store a look-up table of values that each correspond an amount of beverage remaining with a detected pressure rate change, or may use an algorithm that employs a pressure rate change to determine a remaining volume of beverage. In another embodiment, the controller 34 need not include a pressure sensor 39, and may instead provide gas to the container at a regulated pressure until a pressure in the container equalizes with the regulated pressure. The time over which the container takes to equalize pressure may be used by the controller 34 to determine a remaining beverage volume, e.g., by look up table, algorithm, etc. The controller 34 may prevent beverage dispensing during a time that the container is pressurized during volume remaining measurement, or may dispense beverage during a pressurization period used to determine a volume of beverage in the container. (Dispensing of beverage during volume remaining measurement need not be problematic to determining the volume remaining since the controller 34 may store information regarding a rate at which flow out of the container occurs, and/or the algorithm, look up table, or other means by which a remaining volume is determined may be arranged to account for dispensing.)

In another embodiment, the device 1 may be arranged to determine a volume of beverage remaining in a container based on a change in pressure in the container while beverage is being dispensed. For example, generally speaking, a container with a larger gas volume will experience a slower drop in pressure for a unit volume of beverage dispensed than a container with a smaller gas volume. This relationship may be used by the device 1 to determine a remaining beverage volume in a container during dispensing. For example, a source of pressurized gas 100 may be used to deliver gas into a container, either before or during beverage dispensing, and the device 1 may measure a rate at which pressure decreases in the container 700 during dispensing. Based on the pressure decrease rate, the controller 34 may determine an amount of beverage in the container. As in other embodiments, the pressure of gas provided to the container may be regulated, or may not be regulated. Pressure in the container may be measured, e.g., using a pressure sensor 39, as discussed above. To determine the remaining volume of beverage, the controller 34 may store a look-up table of values that each correspond an amount of beverage remaining with a detected pressure rate change, or may use an algorithm that employs a pressure rate change to determine a remaining volume of beverage. The determined amount of beverage remaining in the container 700 may be used to control gas delivery for dispensing, e.g., a container having a relatively small amount of remaining beverage may require a larger volume of gas for dispensing a given amount of beverage than a container that is more full. Thus, for example, the controller 34 may adjust gas valve 36 open times depending on a remaining amount of beverage in the container 700.

In some embodiments, a cross sectional size of one or more lumens in a needle or other conduit or other resistance to flow of the needle/conduit may influence gas and/or beverage flow through the needle or other conduit. In some cases, needles may be coded or otherwise identified so that a controller 34 can receive information regarding a restriction to flow of the needle. For example, needles or other conduits may have an identification number or other text, an RFID tag, a magnet indicator, or other arrangement that includes or represents information regarding flow restriction for the needle. A user may provide the identification number or other indicia to the controller 34 (e.g., by a user interface), or the controller 34 may read the indicia on the needle itself (e.g., in the case of an RFID tag or magnet indicator). The controller 34 may then use the flow restriction information to control gas and/or beverage dispensing.

Where the controller 34 determines an amount of remaining beverage and the device 1 is subsequently (or concurrently) used to dispense beverage, the controller 34 may adjust (reduce) the amount of remaining beverage by an amount of beverage dispensed. For example, the controller 34 may measure an amount of time that a beverage control valve 37 is open and use that information to determine an amount of beverage dispensed. The dispensed beverage may be used to reduce the remaining amount earlier determined to update the remaining amount. Where the controller 34 dispenses during a time that the controller 34 determines an amount of remaining beverage, the controller 34 may take dispensed beverage into account, e.g., an algorithm used to determine an amount of remaining beverage may take beverage dispensed during the measurement operation into account. Note also that the controller 34 may use an amount of dispensed beverage to determine an amount of beverage remaining in a container. For example, when the device 1 is associated with a container 700 that has never been accessed, the device 1 may assume that the container 700 initially has a starting volume of beverage (e.g., 750 ml of wine), and may subtract an amount of beverage dispensed from the starting volume to determine a remaining volume in the container.

The controller 34 may use the determined remaining beverage information in different ways. For example, containers may have identifying indicia, such as an RFID tag, bar code, alphanumeric text, etc., and the controller 34 may associate the remaining beverage information with each specific container. This way, the controller 34 may store the amount of beverage remaining for each of a plurality of containers, and when the device 1 is subsequently used with a previously used container, the controller 34 may display a remaining amount of beverage, such as on a visual display, by audibly announcing a remaining amount, etc. In another embodiment, the controller 34 may communicate a remaining amount of beverage to another device, such as a personal computer, server, smartphone or other device, whether by wireless or wired connection. As will be understood, a smartphone or other similar device may operate an application that enables communication with one or more devices 1, manages display of information and/or user input to the device 1, etc. The application may also manage communication between the device 1 and the smartphone, such as by Bluetooth or other wireless communication, so the devices may share information. This may allow a user to view on the smartphone or other device how much beverage is remaining, as well as other information such as a type of beverage in the container, how much gas is left in the gas source 100 or how much beverage can be dispensed with the remaining gas, a type of gas in the gas source 100 (e.g., argon, carbon dioxide, etc.), when a container was first accessed for dispensing, and/or a size of needle mounted on the device (needle size may be relevant for different container closures. For example, a smaller size needle may be desired for certain types of corks or other closures and/or to help ensure that the cork will reseal upon removal of the needle, whereas larger needles may be desired for faster dispense speeds.).

The controller 34 may also use an ability to detect whether the device is mounted to a container and/or detect features of a container in a variety of ways. For example, the controller 34 may detect whether the device 1 is mounted to a container, e.g., by detecting that the needle has been inserted through a cork, by detecting an RFID tag, barcode or other indicia on a container, by detecting activation of a clamp or other container engagement feature of the device 1, etc., and in response initiate operation of the device 1. For example, if a sensor associated with a clamp of the device 1 indicates that the device 1 is secured to a container 700, the device 1 may start to monitor its orientation and/or an orientation of an attached container to control beverage dispensing, may display gas and/or beverage remaining values, and so on, after detecting that the device 1 is engaged with a container. Also, or alternately, other features regarding the container may be displayed, such as a type of beverage, a temperature of the beverage (where the device 1 is outfitted with a temperature sensor), an indication of when the container was last accessed by the device 1, suggestions for food pairing with the beverage, and so on. As noted above, information may be relayed from the device 1 to a user's smartphone or other device for display to the user, whether by visual indication, audible indication, etc. The device 1 may also use sensed information to access other information, e.g., stored remotely on a webserver, to provide additional information to a user. For example, a device 1 may be equipped with a temperature sensor to detect a temperature of the container itself and/or beverage in the container. Based on the temperature information, and possibly a type of beverage, the device 1 may access stored information to determine if the beverage is within a desired temperature range for suitable serving. If not, the device 1 may indicate the beverage temperature with information regarding optimal serving temperatures.

In some embodiments, the controller 34 may be arranged to determine and track an amount of gas in the gas source, such as a compressed gas cylinder. Such information may be useful, e.g., to alert a user that a gas source is about to run out. For example, in one embodiment the controller may have a pressure sensor 39 arranged to detect a pressure of gas in the gas cylinder 100, and use the detected pressure to determine how much gas remains in the cylinder. This information may be used by the controller 34 to provide information to a user that the cylinder 100 should be replaced, a warning that the cylinder may run out soon, etc. In another embodiment, the controller 34 may determine a pressure in the gas cylinder or other value indicative of an amount of gas left in the cylinder based on an amount of time that a gas control valve 36 or beverage dispense valve 37 is open to cause gas delivery into the container. For example, where a regulator 600 is provided, the controller 34 may store information that represents a total time that the gas source 100 can deliver gas at the regulated pressure. When a gas cylinder or other source 100 is replaced, the controller 34 may detect the replacement and then track a total time that gas is delivered from the gas source 100, e.g., based on how long a gas control valve is open. The total delivery time may be used to indicate an amount of gas left in the source 100, e.g., ¾ full, ½ full, etc., and/or indicate when the source 100 is about to run out. The controller 34 may also refuse to perform a dispensing operation where the gas source 100 does not have sufficient gas to perform the operation. In other arrangements, the controller 34 may determine an amount of gas remaining in a gas source 100 based on how much beverage is dispensed. As discussed above, the controller 34 may determine how much beverage is dispensed from one or more containers, and determine an amount of gas remaining in a gas source 100 based on how much total beverage has been dispensed using the gas source 100. For example, the controller 34 may store information regarding a total number of ounces or other volume measurement a gas source 100 can be used to dispense, and the controller 34 may display an amount of gas remaining that corresponds to the amount of beverage dispensed.

In some embodiments, the controller 34 may detect a gas source 100 and determine characteristics of the gas source 100 for use in operation of the dispensing device 1. For example, the controller 34 may detect an RFID tag, barcode, color tag, or other indicia on a gas source 100 (such as a gas cylinder) an identify a variety of different characteristics of the gas source 100 based on the indicia, such as a type of gas in the source 100, an amount of gas in the source 100, an amount of beverage that may be dispensed using the source 100, an initial pressure of gas in the source 100, etc. The controller 34 may adjust operation of the device 1 based on the type of gas source or other characteristics. For example, if the controller 34 detects that the gas source 100 has a relatively low initial pressure, the controller 34 may select a smaller total beverage volume that can be dispensed using the gas source 100 as compared to a higher pressure gas source. This may allow the controller 34 to more accurately indicate how much gas is remaining in the source 100 over time, i.e., as beverage is dispensed.

In yet another embodiment, the controller 34 may detect when a gas source 100 is nearing an empty state without monitoring how much gas is used from a gas source. In some cases, such as when a single stage regulator 600 is used with a gas source 100, a dispense pressure from the regulator will rise above a normal setting as the gas source 100 is running low. (It is believed that the rise in pressure is due to the relatively low pressure in the gas source 100 being insufficient to cause the regulator valve to close as rapidly as normal.) The controller 34 may detect this rise in pressure using a sensor, such as the pressure sensor 39, and provide an indication that the source 100 is about to run out, stop dispensing operation, or take other suitable action.

In another aspect of the invention, the device 1 may be arranged to stop beverage dispensing while in a pour orientation. For example, the orientation sensor may detect rotation of the container about a longitudinal axis of the container while in a pour orientation and in response the controller 34 may stop dispensing of beverage. That is, similar to the way a person may rotate a wine bottle about its longitudinal axis when stopping pouring of wine into a glass, the device 1 may detect similar rotation of a container and stop dispensing, even if the container remains in a pour orientation. Rotation of the container about the longitudinal axis in an opposite direction while the container is in a pour orientation may be sensed and the controller 34 may resume dispensing. Alternately, the controller 34 may not again begin dispensing until the container is put in a no-pour orientation and then a pour orientation. Note that this aspect of the invention may be combined with an auto-pour feature discussed above where the device 1 senses a container is in a pour orientation and begins beverage dispensing, or may be used independently. For example, the device 1 may be arranged to begin dispensing in response to a user's command, such as pressing a button, and may stop dispensing in response to detecting rotation of the container about its longitudinal axis. Sensing of rotation of the container 700 about its longitudinal axis may be performed by the same or similar sensors discussed above for detecting whether the container is in a pour orientation, e.g., accelerometers, gyroscopes, mercury or other switches, etc.

It has been found that needles having a smooth walled exterior, pencil point or Huber point needle of 16 gauge or higher are effective to penetrate through a wine bottle cork or other closure, while sealing effectively with the cork to prevent the ingress or egress of gases or fluids during beverage extraction. Moreover, such needles allow the cork to reseal after withdrawal of the needle, allowing the bottle and any remaining beverage to be stored for months or years without abnormal alteration of the beverage flavor. Further, such needles may be used to penetrate a foil cover or other wrapping commonly found on wine bottles and other bottles. Thus, the needle may penetrate the foil cover or other element as well as the closure, eliminating any need to remove the foil or other wrapping prior to beverage extraction. Other needle profiles and gauges are also usable with the system.

While in the above embodiments, a user moves the body 3 in a linear fashion relative to the base 2 to insert/remove a needle with respect to a bottle closure, a manual or powered drive mechanism may be used to move a needle relative to a closure. For example, a rail 31 may include a toothed rack, while the base 2 may include a powered pinion gear that engages the rack and serves to move the body 3 relative to the base 2. The pinion may be powered by a user-operated handle, a motor, or other suitable arrangement. In another embodiment, the needle may be moved by a pneumatic or hydraulic piston/cylinder, e.g., which is powered by pressure from the gas cylinder 100 or other source.

With the correct needle gauge, it has been found that a passageway (if any) that remains following removal of the needle from a cork self-seals against egress or ingress of fluids and/or gasses under normal storage conditions. Thus, a needle may be inserted through a closure to extract beverage, and then be removed, allowing the closure to reseal such that beverage and gas passage through the closure is prevented. While multiple needle gauges can work, preferred needle gauges range from 16 to 22 gauge, with an optimal needle gauge in some embodiments being between 17 and 20 gauge. These needles gauges may offer optimal fluid flow with minimal pressures inside the bottle while doing an acceptably low level of damage to the cork even after repeated insertions and extractions.

Multiple needle lengths can be adapted to work properly in various embodiments, but it has been found that a minimum needle length of about 1.5 inches is generally required to pass through standard wine bottle corks. Needles as long as 9 inches could be employed, but the optimal range of length for some embodiments has been found to be between 2 and 2.6 inches. (Needle length is the length of a needle that is operable to penetrate a closure and/or contact a needle guide for guidance in moving through the closure.) The needle may be fluidly connected to the valve directly through any standard fitting (e.g. NPT, RPT, Leur, quick-connect or standard thread) or alternatively may be connected to the valve through an intervening element such as a flexible or rigid tube. When two or more needles are used, the needle lengths may be the same or different and vary from 0.25 inches to 10 inches. Creating distance between the inlet/outlets of the needles can prevent the formation of bubbles.

In some embodiments, a suitable gas pressure is introduced into a bottle to extract beverage from the bottle. For example, with some wine bottles, it has been found that a maximum pressure of between around 40 and 50 psi may be introduced into the bottle without risking leakage at, or ejection of, the cork, although pressures of between around 15 and 30 psi have been found to work well. These pressures are well tolerated by even the weakest of cork-to-bottle seals at the bottle opening without causing cork dislodging or passage of liquid or gas by the cork, and provide for relatively fast beverage extraction. The lower pressure limit in the bottle during wine extraction for some embodiments has been found to be between about 0 and 20 psi. That is, a pressure between about 0 and 20 psi has been found needed in a bottle to provide a suitably fast extraction of beverage from the bottle. In one example using a single 17 to 20 gauge needle, a pressure of 30 psi was used to establish an initial pressure in a wine bottle, and rapid wine extraction was experienced even as the internal pressure dropped to about 15-20 psi.

The source of pressurized gas can be any of a variety of regulated or unregulated pressurized gas bottles filled with any of a variety of non-reactive gasses. In a preferred embodiment, the gas cylinder contains gas at an initial pressure of about 2000-3000 psi. This pressure has been found to allow the use of a single relatively small compressed gas cylinder (e.g., about 3 inches in length and 0.75 inches in diameter) for the complete extraction of the contents of several bottles of wine. Multiple gasses have been tested successfully over extended storage periods, and preferably the gas used is non-reactive with the beverage within the bottle, such as wine, and can serve to protect the beverage oxidation or other damage. Suitable gases include nitrogen, carbon dioxide, argon, helium, neon and others. Mixtures of gas are also possible. For example, a mixture of argon and another lighter gas could blanket wine or other beverage in argon while the lighter gas could occupy volume within the bottle and perhaps reduce the overall cost of the gas.

The embodiments above, a single needle with a single lumen is used to introduce gas into the bottle and extract beverage from the bottle. However, in other embodiments two or more needles may be used, e.g., one needle for gas delivery and one needle for beverage extraction. In such an embodiment, the valve(s) may operate to simultaneously open a flow of gas to the bottle and open a flow of beverage from the bottle. The needles may have the same or different diameters or the same or different length varying from 0.25 to 10 inches. For example, one needle delivering gas could be longer than another that extracts wine from the bottle. Alternately, a two lumen needle may be employed where gas travels in one lumen and beverage travels in the other. Each lumen could have a separate entrance and exit, and the exits could be spaced from each other within the bottle to prevent circulation of gas.

Control of the system may be performed by any suitable control circuitry of the controller 34, which may include a programmed general purpose computer and/or other data processing device along with suitable software or other operating instructions, one or more memories (including non-transient storage media that may store software and/or other operating instructions), a power supply for the control circuitry and/or other system components, temperature and liquid level sensors, pressure sensors, RFID interrogation devices or other machine readable indicia readers (such as those used to read and recognize alphanumeric text, barcodes, security inks, etc.), input/output interfaces (e.g., such as the user interface to display information to a user and/or receive input from a user), communication buses or other links, a display, switches, relays, triacs, motors, mechanical linkages and/or actuators, or other components necessary to perform desired input/output or other functions.

While aspects of the invention have been shown and described with reference to illustrative embodiments, it will be understood by those skilled in the art that various changes in form and details may be made therein without departing from the scope of the invention encompassed by the appended claims.

The invention claimed is:

1. A beverage dispensing device, comprising:
a base to engage with a neck of a beverage container;
a body movably mounted to the base between upper and lower positions and having a needle attached to and extending from the body, the needle being arranged to be inserted through a closure of a beverage container to introduce pressurized gas into the beverage container and extract beverage from the container; and
a latch that releasably locks the body in the upper position until the container neck is engaged by the base, the latch constructed and arranged to release the body for movement from the upper position to the lower position to insert the needle through the closure in response to engagement of the base with the container neck;
wherein the base includes a stop arranged to contact a top of the container neck when engaged by the base, the latch being configured to release the body for movement in response to the top of the container neck contacting the stop.

2. The device of claim 1, wherein the stop includes a needle guide arranged to contact a top of a container neck engaged by the base and to guide movement of the needle through the closure with downward movement of the body relative to the base.

3. A beverage dispensing device, comprising:
a base to engage with a neck of a beverage container;
a body movably mounted to the base between upper and lower positions and having a needle attached to and extending from the body, the needle being arranged to be inserted through a closure of a beverage container to introduce pressurized gas into the beverage container and extract beverage from the container; and
a latch that releasably locks the body in the upper position until the container neck is engaged by the base, the latch constructed and arranged to release the body for movement from the upper position to the lower position to insert the needle through the closure in response to engagement of the base with the container neck;
wherein the base includes a clamp defining a receiving space in which the container neck is received and engaged by the clamp, and wherein the latch is constructed and arranged to release the body to move to the lower position in response to the container neck being fully received in the receiving space.

4. The device of claim 3, wherein the clamp includes at least one clamp arm that defines the receiving space for the container neck, the at least one arm being spring biased to move relative to the base to exert an engagement force on the container neck when fully received in the receiving space.

5. The device of claim 4, wherein the at least one clamp arm includes two clamp arms that are spring biased to move toward each other and engage the container neck between the clamp arms.

6. The device of claim 4, wherein the at least one clamp arm defines an entry opening to the receiving space at a bottom of the clamp, the clamp being arranged to fully receive the container neck into the receiving space by inserting the container neck into the entry opening and moving the clamp downwardly relative to the container neck so as to move the at least one clamp arm against the spring bias.

7. The device of claim 6, wherein the at least one clamp arm includes a container engagement surface with a lower portion that slopes inwardly and upwardly relative to the receiving space, the lower portion being arranged to allow the clamp to be pushed downwardly on the container neck to receive the container neck in the receiving space and move the at least one clamp away from the container neck while the at least one clamp exerts an engagement force on the container neck.

8. The device of claim 7, wherein the lower portion of the container engagement surface is arranged to contact a lip of the container neck such that the lower portion exerts a radially outward force on the at least one clamp arm to move the at least one clamp arm away from the lip of the container neck as the clamp is moved downwardly relative to the container neck to receive the container neck in the receiving space.

9. The device of claim 7, wherein the container engagement surface extends vertically on the at least one clamp arm.

10. The device of claim 7, wherein the container engagement surface includes an upper portion positioned above the lower portion that slopes outwardly and upwardly relative to the receiving space and the upper portion is arranged to disengage the clamp from a fully received container neck as the clamp is pulled upwardly relative to the container neck.

11. The device of claim 10, wherein the upper portion exerts a radially outward force on the at least one clamp arm to move the at least one clamp arm against the spring bias and away from the container neck as the clamp is moved upwardly relative to the container neck.

12. The device of claim 10, wherein the container engagement surface is arranged to contact the container neck and exert a radially inward force on the container neck when in the receiving space.

13. The device of claim 3, wherein the base includes a stop arranged at an upper end of the receiving space to contact a top of the container neck, the container neck being fully received in the receiving space when the top of the container neck contacts the stop.

14. A beverage dispensing device, comprising:
   a base to engage with a neck of a beverage container;
   a body movably mounted to the base between upper and lower positions and having a needle attached to and extending from the body, the needle being arranged to be inserted through a closure of a beverage container to introduce pressurized gas into the beverage container and extract beverage from the container;
   a source of pressurized gas arranged to deliver pressurized gas to the needle; and
   a latch that releasably locks the body in the upper position until the container neck is engaged by the base, the latch constructed and arranged to release the body for movement from the upper position to the lower position to insert the needle through the closure in response to engagement of the base with the container neck.

15. The device of claim 14, further comprising a valve arranged to control a flow of pressurized gas to the needle.

* * * * *